Jan. 28, 1958 K. W. LESHER 2,821,437
ATOMIZER FOR BRAKE COOLING
Filed April 5, 1955 2 Sheets-Sheet 1
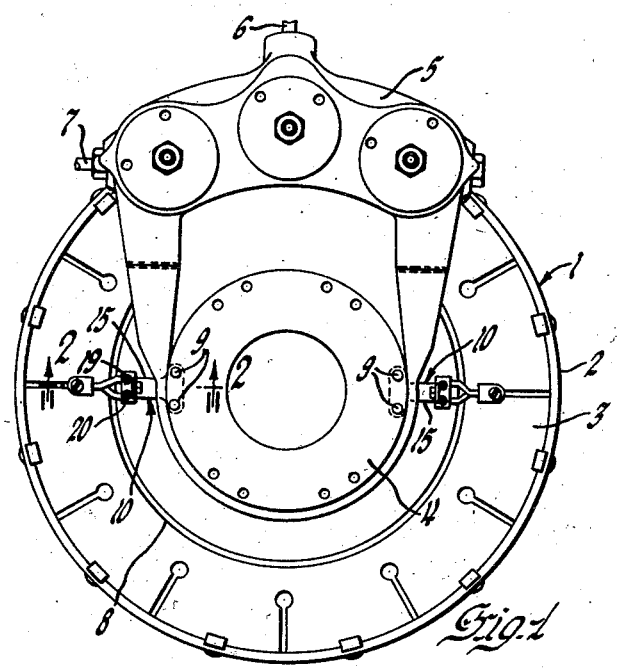
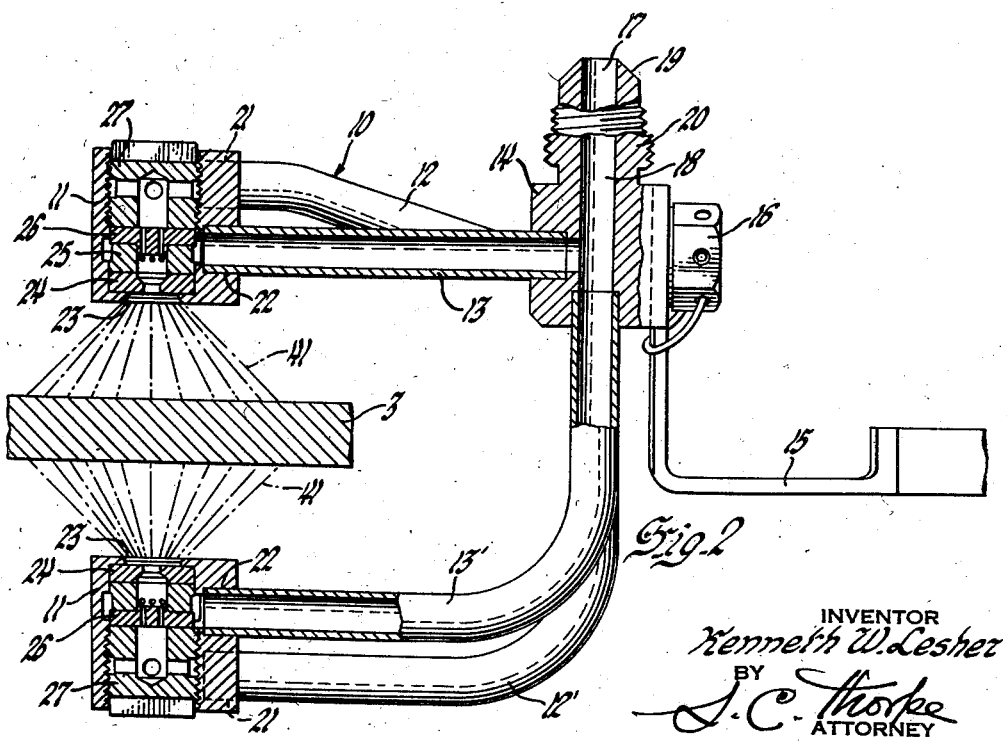
INVENTOR
Kenneth W. Lesher
BY
J. C. Thorke
ATTORNEY Jan. 28, 1958 K. W. LESHER 2,821,437
ATOMIZER FOR BRAKE COOLING
Filed April 5, 1955 2 Sheets-Sheet 2
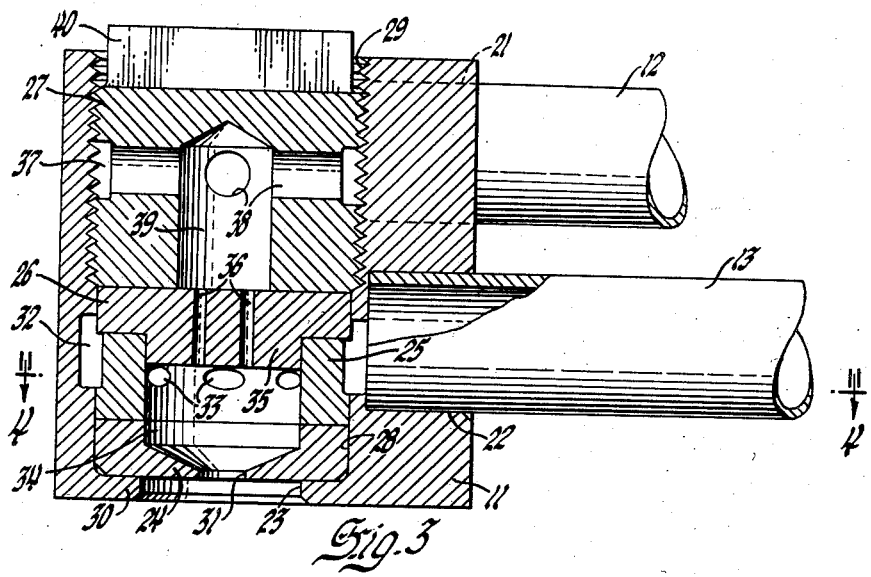
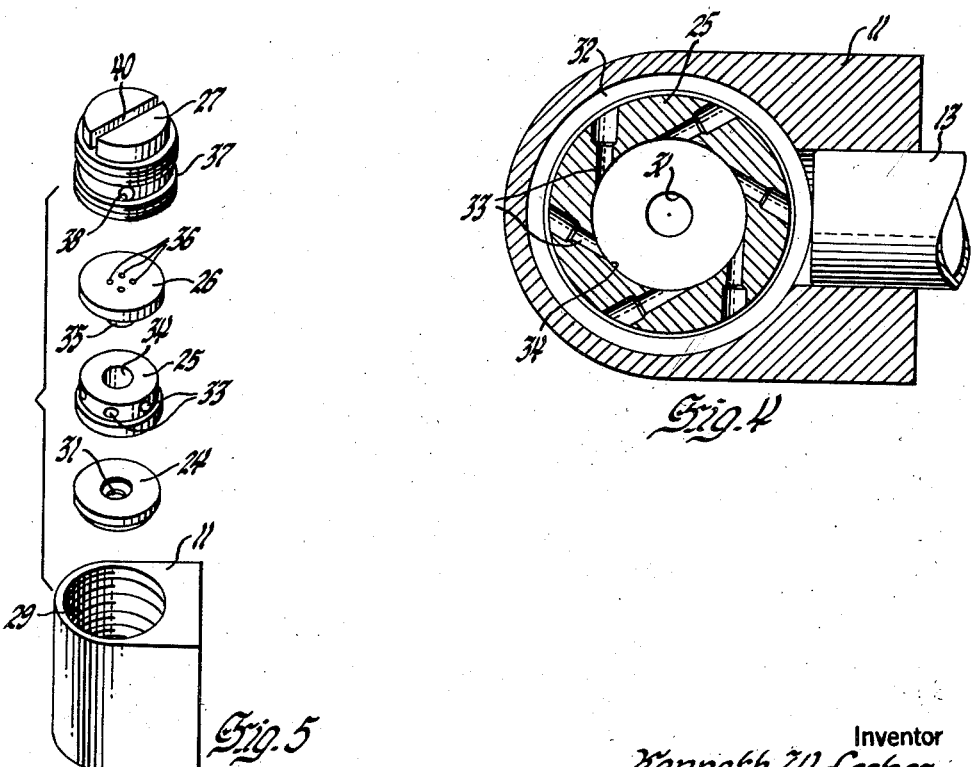
Inventor
Kenneth W. Lesher
By
S. C. Thorpe
Attorney United States Patent Office
2,821,437
Patented Jan. 28, 1958

2,821,437

ATOMIZER FOR BRAKE COOLING

Kenneth W. Lesher, Grand Rapids, Mich., assignor to General Motors Corporation, Detroit, Mich., a corporation of Delaware Application April 5, 1955, Serial No. 499,404

2 Claims. (Cl. 299—115)

This invention relates to cooling apparatus, particularly adapted for vehicle wheel disk brake cooling.

The principal object of the invention is to provide a device mountable on a brake supporting or other fixed means associated with a wheel for atomizing and spraying liquid coolant on to the heated brake surfaces of the wheel.

In the preferred embodiment selected as illustrative of my invention this device takes the form of a manifold into which coolant and air or other gas under pressure is delivered and conducted to one or more nozzle heads each having an outlet and means internally of the head to atomize the coolant with the air and direct it through the outlet in the form of a spray.

Referring now to the drawings illustrating this embodiment:

Figure 1 is a general view of a disk brake vehicle wheel with my atomizing and spray apparatus mounted thereon in operative position.

Figure 2 is an enlarged view of the atomizing and spraying apparatus with parts broken away and shown in section substantially along the line 2—2 of Figure 1.

Figure 3 is an enlarged sectional view of one of the spray heads and its connecting coolant and air conduits shown in Figure 2.

Figure 4 is a sectional view taken substantially on line 4—4 of Figure 3.

Figure 5 is an exploded view of the nozzle head assembly showing the parts in perspective which make up the nozzle head assembly.

As indicated in Figure 1 a vehicle wheel and brake disk assembly indicated generally by the numeral 1 comprises a wheel rim 2 secured to a disk shape braked surface member 3, which parts are suitably journaled in a bearing support means 4. Rigid with the bearing support means is a housing 5 containing the disk engageable brake members (not shown) which may be operable in any desired manner as by hydraulic or other fluid pressure introduced at the connections 6 and 7. The inner margin of the disk 3 terminates at an edge 8 spaced radially outward of the bearing support means 4, and attached to the latter as by bolts 9 on diametrically opposite sides of the wheel axis are identical atomizing and spraying devices designated generally by the numeral 10.

Referring to Figure 2, each of these devices comprises a pair of oppositely directed atomizing heads 11 suitably spaced from opposite sides of the brake disk 3 and supplied through conduits 12, 12' and 13, 13' with water or other liquid coolant and air or gas, respectively, from a manifold structure 14 which is fixed to the bracket 15 by a bolt 16. The manifold 14 is in the form of a fitting with two internal manifold passages 17 and 18 each leading from respective air and coolant inlets 19 and 20 through a pair of outlets to the branched air conduits 12, 12' and the branched coolant conduits 13, 13'. As will be noted, the conduits terminate at their opposite ends in inlet openings 21 and 22 in the heads 11, these openings being in spaced relation axially of spray discharge outlets 23 in the heads facing the disk 3.

As shown disassembled in Figure 5, each atomizer assembly consists of the head 11, a nozzle 24, a coolant disk ring 25, an air directing disk 26 and a plug 27. Referring to Figure 3 the head 11 has a bore 28 threaded and open at one end 29 and restricted at its opposite end by a flange 30 which defines the spray outlet 23. The nozzle 24 is annular in form with a central orifice 31 and fits the bore 28 closely at its periphery, being seated therein against the flange 30. Seated, in turn, against the nozzle is the lower end of the coolant directing ring 25 whose outer periphery and the surrounding face of the bore are relieved to provide a coolant receiving chamber 32 which connects with the coolant inlet 22. As best shown in Figure 4, the side walls of this ring 23 have a plurality of circumferentially spaced ports 33 extending tangentially therethrough from the coolant receiving chamber 32 and terminating in a mixing chamber 34 open at one end to the nozzle orifice 31.

Seated on the ring 25 and closely fitting the bore 28 is an air directing disk 26 whose lower end portion 35 is of reduced diameter to fit and extend partially into the ring 25 and define the upper end of the mixing chamber 34. The air directing disk 26 has a plurality of laterally spaced ports 36 extending longitudinally therethrough in a group concentric with the aligned axes of the nozzle 24 and outlet 23.

Threaded into the bore 28 through its open end 29 is the plug 27 which has its periphery relieved by an annular groove 37 registering with the air inlet 21 of the head and one or more transverse passages 38, which in turn are connected by a central longitudinal passage 38 large enough to connect directly with all of the relatively small passages 36 in the disk 26. The cross slot 40 at the opposite end of the plug may be provided for engagement with a screw driver or other tool used to assemble and disassemble it from the head 11.

During operation, the air and coolant supplied under pressure to the manifold inlets is conducted through its respective passages 17 and 18, conduits 12, 13 and 12', 13' to the receiving chambers 37 and 32 in each head 11. From the air receiving chamber 37 the air flows through the transverse ports 38 and longitudinal port 39 to the air directing disk 26, through which the air flow velocity is increased as the air passes into the mixing chamber 34 via the restricted air ports 36. By reason of the longitudinal direction and central grouping of these ports 36 the air flowing through the mixing chamber strikes the inner surface of the nozzle adjacent its orifice 31. Simultaneously, the coolant flowing into the mixing chamber in a rotative direction through the tangential ports 33 tends to envelop the flow of air toward the nozzle, and the resulting intermixture of the coolant and air causes an atomization of the liquid coolant into finely divided particles which flow out, interspersed with the air, through the orifice in divergent angular directions to provide the spray indicated at 41 in Figure 2.

While only a single preferred embodiment of the invention has been disclosed, it is appreciated that numerous minor changes in the construction and arrangement of the parts may be made without departing from the spirit and scope of the invention as defined in the following claims.

I claim:

1. Cooling apparatus for a braked member or the like having oppositely disposed working surfaces, comprising a manifold having separate air and coolant passages therein each having an inlet and a pair of outlets, a pair of atomizer heads in spaced relation having opposingly directed outlets for spraying coolant against the opposite surfaces of said member, each said head having a generally cylindrical coolant and air mixing chamber therein communicating at one end with said outlet and air and coolant inlets connected to respectively different air and coolant outlets of said passages, air directing means within each said head defining the opposite end of said chamber and directing the air flow from said head air inlet in a path through the chamber substantially coaxially of the head outlet, and coolant directing means within each said head defining the sides of said chamber and directing the coolant flow tangentially into said chamber from said head coolant inlet.

2. Spray cooling apparatus for a braked surface or the like, comprising two fluid conduits adapted to be respectively supplied with liquid coolant and gas under pressure, and an atomizer assembly including a hollow head with a bore open at one end and terminating at its opposite end with a shoulder defining a reduced diameter outlet from the head, an annular nozzle fitting said bore and seated on said shoulder, a coolant directing ring fitting said bore and seated at one end on said nozzle, one portion of said ring external periphery and the surrounding surface of said bore being relieved to define an annular coolant receiving chamber within said head, said ring having a plurality of circumferentially spaced ports extending tangentially therethrough between said coolant chamber and the ring internal periphery, a gas directing disk fitting said bore and seated on the opposite end of said ring, said disk having a plurality of laterally spaced ports extending axially therethrough, and a plug closing the open end of said bore and clamping said disk, ring and nozzle against said shoulder, said plug having a port extending transversely thereof and an axial port connecting said transverse port with said disk ports, one portion of said plug external periphery and the surrounding surface of said bore being relieved to define a gas receiving chamber in fluid communication with said transverse port, said head having gas and coolant inlets connecting said gas and coolant supplied conduits with said gas and coolant receiving chambers, respectively.

References Cited in the file of this patent

UNITED STATES PATENTS

| | | |
|---|---|---|
| 1,023,707 | Anthony | Apr. 16, 1912 |
| 1,922,920 | Aherne | Aug. 15, 1933 |
| 2,149,115 | De Foe | Feb. 28, 1939 |
| 2,378,100 | Pogue | June 12, 1945 |
| 2,400,225 | Eksergian | May 12, 1946 |
| 2,439,257 | Lum | Apr. 6, 1948 |
| 2,539,315 | Murphy | Jan. 23, 1951 |

FOREIGN PATENTS

| | | |
|---|---|---|
| 454,102 | Great Britain | Sept. 24, 1936 |